(12) United States Patent
Gschwind

(10) Patent No.: US 10,877,759 B2
(45) Date of Patent: Dec. 29, 2020

(54) MANAGING THE CAPTURE OF INFORMATION IN APPLICATIONS WITH PREFIX INSTRUCTIONS

(71) Applicant: INTERNATIONAL BUSINESS MACHINES CORPORATION, Armonk, NY (US)

(72) Inventor: Michael K. Gschwind, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 505 days.

(21) Appl. No.: 14/871,979

(22) Filed: Sep. 30, 2015

(65) Prior Publication Data
US 2017/0090923 A1  Mar. 30, 2017

(51) Int. Cl.
*G06F 9/30* (2018.01)
*G06F 9/38* (2018.01)

(52) U.S. Cl.
CPC ........ *G06F 9/3016* (2013.01); *G06F 9/30076* (2013.01); *G06F 9/3824* (2013.01)

(58) Field of Classification Search
None
See application file for complete search history.

(56) References Cited

U.S. PATENT DOCUMENTS

| | | | |
|---|---|---|---|
| 5,303,358 A | 4/1994 | Baum | |
| 5,491,808 A | 2/1996 | Geist, Jr. | |
| 5,537,629 A * | 7/1996 | Brown | G06F 9/3822 712/210 |
| 5,809,273 A | 9/1998 | Favor | |
| 5,822,559 A | 10/1998 | Narayan | |
| 5,867,701 A | 2/1999 | Brown et al. | |
| 5,944,841 A | 8/1999 | Christie | |
| 6,014,735 A | 1/2000 | Chennupaty et al. | |
| 6,058,464 A | 5/2000 | Taylor | |
| 6,167,505 A | 12/2000 | Kubota | |
| 6,240,506 B1 | 5/2001 | Miller | |
| 6,260,134 B1 | 7/2001 | Zuraski, Jr. et al. | |
| 6,275,927 B2 | 8/2001 | Roberts | |
| 6,336,178 B1 | 1/2002 | Favor | |
| 6,571,330 B1 | 5/2003 | McGrath | |

(Continued)

FOREIGN PATENT DOCUMENTS

| | | |
|---|---|---|
| EP | 1351135 B1 | 12/2010 |
| GB | 2486905 A | 4/2012 |

OTHER PUBLICATIONS

Office Action for U.S. Appl. No. 14/871,970 dated Aug. 9, 2017, pp. 1-24.

(Continued)

*Primary Examiner* — Corey S Faherty
(74) *Attorney, Agent, or Firm* — Steven Chiu Esq.; Blanche E. Schiller Esq.; Heslin Rothenberg Farley & Mesiti P.C.

(57) ABSTRACT

Managing the capture of information. A plurality of instruction units of an instruction stream are received in parallel by a plurality of instruction decode units of a processor. One instruction decode unit of the plurality of instruction decode units receives a prefix instruction and another instruction decode unit of the plurality of instruction decode units receives a prefixed instruction. The prefixed instruction is an instruction to be modified by the prefix instruction. Information associated with processing of the plurality of instruction units is captured, and the capturing includes modifying the information to be captured to manage the prefix instruction and the prefixed instruction separately received by the instruction decode units as a single instruction.

20 Claims, 19 Drawing Sheets

(56) References Cited

U.S. PATENT DOCUMENTS

| | | | |
|---|---|---|---|
| 6,970,998 | B1 | 11/2005 | Favor |
| 7,181,596 | B2 | 2/2007 | Henry et al. |
| 7,487,338 | B2 | 2/2009 | Matsuo |
| 9,329,869 | B2 | 5/2016 | Gschwind |
| 9,870,305 | B2 | 1/2018 | Gschwind |
| 9,870,308 | B2 | 1/2018 | Gschwind |
| 2001/0013095 | A1 | 8/2001 | Holmann |
| 2003/0135789 | A1 | 7/2003 | Dewitt, Jr. |
| 2003/0236965 | A1 | 12/2003 | Scheaffer |
| 2004/0186981 | A1 | 9/2004 | Christie |
| 2004/0250053 | A1 | 12/2004 | McGrath |
| 2005/0033940 | A1 | 2/2005 | McGrath |
| 2007/0260849 | A1 | 11/2007 | Chen et al. |
| 2008/0215856 | A1 | 9/2008 | Gschwind |
| 2008/0282066 | A1 | 11/2008 | May |
| 2009/0019257 | A1 | 1/2009 | Shen |
| 2010/0064119 | A1 | 3/2010 | Arakawa |
| 2010/0332803 | A1* | 12/2010 | Yoshida ............... G06F 9/30101 712/213 |
| 2011/0035745 | A1 | 2/2011 | Li et al. |
| 2012/0331273 | A1 | 12/2012 | Smith et al. |
| 2013/0086363 | A1 | 4/2013 | Gschwind |
| 2013/0275723 | A1 | 10/2013 | Combs |
| 2014/0095833 | A1 | 4/2014 | Gschwind et al. |
| 2014/0164741 | A1 | 6/2014 | Gschwind et al. |
| 2015/0347144 | A1 | 12/2015 | Whittaker |
| 2017/0090931 | A1 | 3/2017 | Frazier et al. |
| 2017/0090932 | A1 | 3/2017 | Frazier et al. |
| 2017/0090939 | A1 | 3/2017 | Gschwind |
| 2017/0090940 | A1 | 3/2017 | Gschwind |
| 2017/0091064 | A1 | 3/2017 | Gschwind |
| 2017/0091065 | A1 | 3/2017 | Gschwind |
| 2018/0113784 | A1 | 4/2018 | Gschwind |
| 2018/0113785 | A1 | 4/2018 | Gschwind |

OTHER PUBLICATIONS

Frazier, Giles R., "Extending Data Range Addressing," U.S. Appl. No. 15/194,666, filed Jun. 28, 2016, pp. 1-58.

Gschwind, Michael K., "Debugging of Prefixed Code," U.S. Appl. No. 15/195,800, filed Jun. 28, 2016, pp. 1-52.

List of IBM Patents or Patent Applications Treated as Related dated Oct. 24, 2016, pp. 1-2.

Mel, Peter and Tim Grance, "The NIST Definition of Cloud Computing," National Institute of Standards and Technology, Information Technology Laboratory, Special Publication 800-145, Sep. 2011, pp. 1-7.

"z/Architecture Principles of Operation," IBM® Publication No. SA22-7832-10, Eleventh Edition, Mar. 2015, pp. 1-1732.

"Power ISA™ Version 2.07B," International Business Machines Corporation, Apr. 9, 2015, pp. 1-1527.

"Intel® 64 and IA-32 Architectures Developer's Manual: vol. 2A, Instructions Set Reference, A-L," Order No. 253666-045US, Jan. 2013, pp. 1-524.

"Intel® 64 and IA-32 Architectures Developer's Manual: vol. 2B, Instructions Set Reference, M-Z," Order No. 253667-045US, Jan. 2013, pp. 1-550.

Binder, Walter et al., "Advanced Java Bytecode Instrumentation," Proceedings of the 5th International Symposium on Principles and Practice of Programming in Java, Sep. 2007, pp. 135-144.

Frazier, Giles R., "Extending Data Range Addressing," U.S. Appl. No. 14/871,959, filed Sep. 30, 2015, pp. 1-62.

Gschwind, Michael K., "Exception Handling for Applications with Prefix Instruction," U.S. Appl. No. 14/871,970, filed Sep. 30, 3015, pp. 1-56.

Gschwind, Michael K., "Exception Handling for Applications with Prefix Instruction," U.S. Appl. No. 14/941,575, filed Nov. 14, 2015, pp. 1-51.

Gschwind, Michael K., "Debugging of Prefixed Code," U.S. Appl. No. 14/871,985, filed Sep. 30, 2015, pp. 1-55.

List of IBM Patents or Patent Applications Treated as Related dated Mar. 16, 2016, pp. 1-2.

Office Action for U.S. Appl. No. 14/871,985 dated Oct. 5, 2016, pp. 1-26.

Final Office Action for U.S. Appl. No. 14/871,985 dated May 3, 2017, pp. 1-24.

Office Action for U.S. Appl. No. 14/871,959 dated Jun. 1, 2017, pp. 1-32.

* cited by examiner

MANAGING THE CAPTURE OF INFORMATION IN APPLICATIONS WITH PREFIX INSTRUCTIONS

BACKGROUND

One or more aspects relate, in general, to processing within a computing environment, and in particular, to managing certain types of instructions.

Systems provide a variety of ways to manage instructions, e.g., for debugging, performance monitoring, program tracing, and so forth. When applications include certain types of instructions, such as prefix instructions, the managing is to take into account these types of instructions, which may be handled differently.

Prefix instructions are used to modify subsequent instructions, and in one example, are used to extend addressability. For instance, different computer system architectures offer data addressing with different displacements providing varying sizes of directly addressable data ranges. As examples, the Power Architecture, offered by International Business Machines Corporation, Armonk, N.Y., provides data addressing with a 16-bit displacement providing a 64 KB (kilobyte) directly addressable data range, while the x86 architecture, offered by Intel Corporation, provides data addressing with a 32-bit displacement providing a 4 GB (gigabyte) directly addressable data range.

The size of the directly addressable data range impacts and limits software applications. For instance, the size of global data areas, such as a Global Offset Table or Table of Contents used by software applications to locate global variables, is limited by the size of the directly addressable data range. As an example, if 16 bits is the maximum size of an immediate offset from a base register, then the size of the directly usable global data area is limited to 64 KB.

To extend addressability, a prefix instruction may be used. A prefix instruction is executed and passes operands to a next instruction, and may be used to extend addressability.

SUMMARY

Shortcomings of the prior art are overcome and additional advantages are provided through the provision of a computer program product for managing the capture of information. The computer program product includes a storage medium readable by a processing circuit and storing instructions for execution by the processing circuit for performing a method. The method includes, for instance, receiving, in parallel by a plurality of instruction decode units of a processor, a plurality of instruction units of an instruction stream to be processed, wherein one instruction decode unit of the plurality of instruction decode units receives a prefix instruction and another instruction decode unit of the plurality of instruction decode units receives a prefixed instruction, the prefixed instruction being an instruction to be modified by the prefix instruction; and capturing information associated with processing of the plurality of instruction units, wherein the capturing includes modifying the information to be captured to manage the prefix instruction and the prefixed instruction separately received by the instruction decode units as a single instruction. This enables, e.g., instructions that are separate from one another and received separately by decode units to be managed as a single instruction for certain processing.

The capturing of the information includes, in one embodiment, counting a number of instructions to be processed, wherein the counting skips counting one of the prefix instruction or the prefixed instruction, and counts the other of the prefix instruction or the prefixed instruction. In another embodiment, the capturing of the information includes sampling instructions, and the sampling includes skipping one of the prefix instruction or the prefixed instruction.

In one embodiment, the captured information is provided to be used in managing the processor. In yet a further embodiment, an indication of the prefix instruction is provided.

In yet a further aspect, a determination is made as to whether a last instruction decode unit of the plurality of instruction decode units is to receive the prefix instruction. Based on determining that the last instruction decode unit is to receive the prefix instruction, delaying forwarding the prefix instruction to the one instruction decode unit until both the prefix instruction and the prefixed instruction are to be received in parallel. This facilitates processing, including the decoding of the instructions.

The delaying forwarding includes, for instance, saving the prefix instruction for later processing; and including the prefix instruction in a next group of a plurality of instruction units to be processed.

As examples, the prefix instruction is a same size as the prefixed instruction, and a size of an instruction unit is defined by an instruction set architecture of an architecture of the processor.

In yet a further aspect, the prefixed instruction is executed. A determination is made that an event has occurred. Based on determining the event has occurred, reporting the event and an indication that the prefixed instruction has the prefix.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with an aspect of the present invention, a management facility is provided that is used to capture information (e.g., record events) associated with instructions to be processed. In one example, the managing includes tracking and reporting of information associated with applications that have prefix instructions. A prefix instruction is used, for instance, to extend addressability of instructions, and therefore, addressing of directly addressable data ranges. In one embodiment, the prefix instruction is used to override (i.e., ignore) one or more fields explicitly specified by an instruction (referred to as a prefixed instruction), in which an overridden field specifies an operand or data to be used to obtain an operand; and/or the prefix provides additional bits to be used with one or more immediate fields of the instruction. The manner in which such instructions, e.g., prefix instructions and/or prefixed instructions, are tracked and reported may be different than other instructions, as described herein.

Figure 1A:
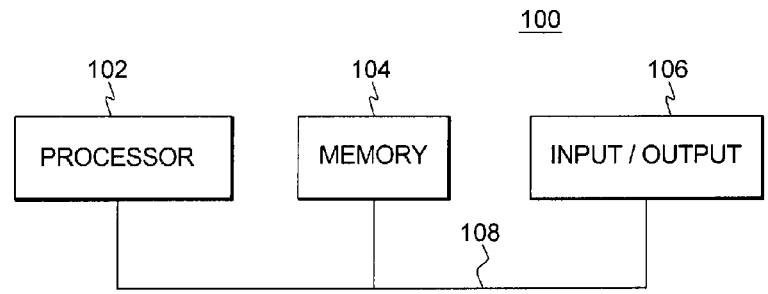
FIG. 1A depicts one example of a computing environment to incorporate and/or use one or more aspects of the present invention.

One embodiment of a computing environment to incorporate and use one or more aspects of a management facility is described with reference to FIG. 1A. A computing environment 100 includes, for instance, a processor 102 (e.g., a central processing unit), a memory 104 (e.g., main memory), and one or more input/output (I/O) devices and/or interfaces 106 coupled to one another via, for example, one or more buses 108 and/or other connections.

In one example, processor 102 is based on the z/Architecture offered by International Business Machines Corporation, and is part of a server, such as the System z server, which is also offered by International Business Machines Corporation and implements the z/Architecture. One embodiment of the z/Architecture is described in an IBM® publication entitled, "z/Architecture Principles of Operation," IBM® Publication No. SA22-7832-10, Eleventh Edition, March 2015, which is hereby incorporated by reference herein in its entirety. In one example, the processor executes an operating system, such as z/OS, also offered by International Business Machines Corporation. IBM®, Z/ARCHITECTURE® and Z/OS® (as well as Z/VM® referenced below) are registered trademarks of International Business Machines Corporation, Armonk, N.Y., USA. Other names used herein may be registered trademarks, trademarks, or product names of International Business Machines Corporation or other companies.

In a further embodiment, processor 102 is based on the Power Architecture offered by International Business Machines Corporation. One embodiment of the Power Architecture is described in "Power ISA™ Version 2.07B," International Business Machines Corporation, Apr. 9, 2015, which is hereby incorporated by reference herein in its entirety. POWER ARCHITECTURE® is a registered trademark of International Business Machines Corporation, Armonk, N.Y.

In yet a further embodiment, processor 102 is based on an Intel architecture offered by Intel Corporation. One embodiment of the Intel architecture is described in "Intel® 64 and IA-32 Architectures Developer's Manual: Vol. 2B, Instructions Set Reference, A-L," Order Number 253666-045US, January 2013, and "Intel® 64 and IA-32 Architectures Developer's Manual: Vol. 2B, Instructions Set Reference, M-Z," Order Number 253667-045US, January 2013, each of which is hereby incorporated by reference herein in its entirety. Intel® is a registered trademark of Intel Corporation, Santa Clara, Calif.

Figure 1B:
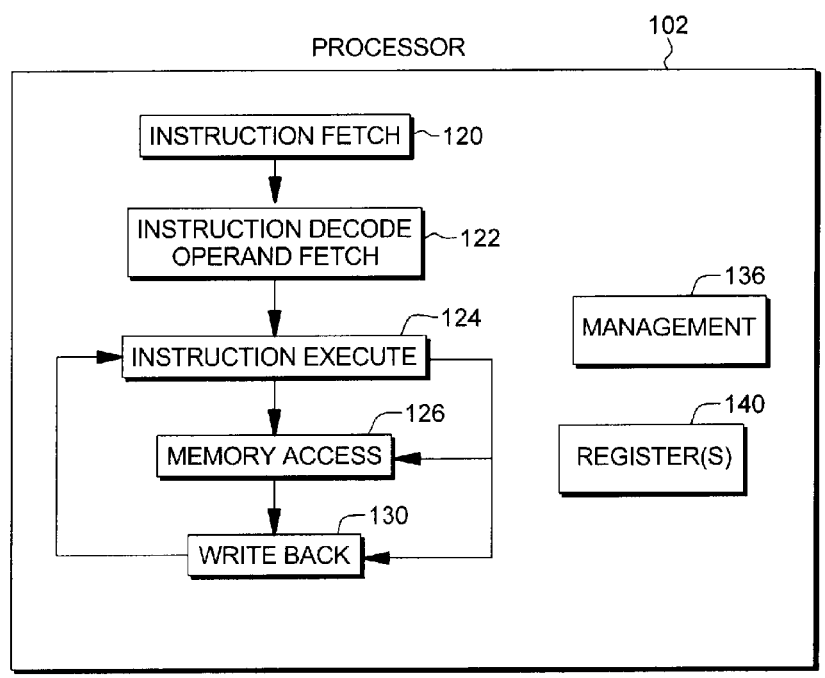
FIG. 1B depicts further details of a processor of the computing environment of FIG. 1A, in accordance with an aspect of the present invention.

Processor 102 includes a plurality of functional components used to execute instructions. As depicted in FIG. 1B, these functional components include, for instance, an instruction fetch component 120 to fetch instructions to be executed; an instruction decode unit 122 to decode the fetched instructions and to obtain operands of the decoded instructions; an instruction execute component 124 to execute the decoded instructions; a memory access component 126 to access memory for instruction execution, if necessary; and a write back component 130 to provide the results of the executed instructions. One or more of these components may, in accordance with an aspect of the present invention, provide management functionality by including at least a portion of or having access to a management component 136. This functionality is described in further detail below.

Processor 102 also includes, in one embodiment, one or more registers 140 to be used by one or more of the functional components.

Figure 2:
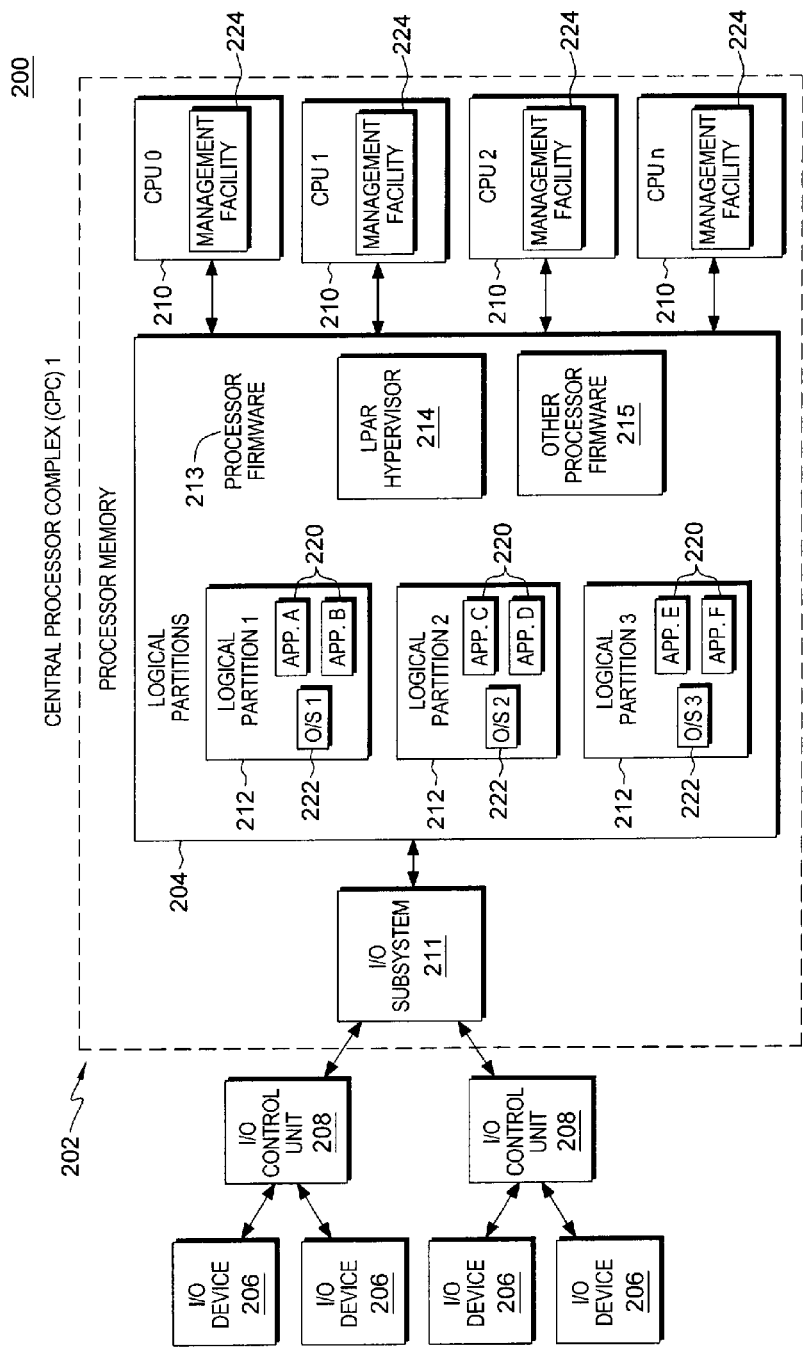
FIG. 2 depicts another embodiment of a computing environment to incorporate and/or use one or more aspects of the present invention.

Another embodiment of a computing environment to incorporate and use one or more aspects of the management facility is described with reference to FIG. 2. In one example, a computing environment 200 is based on the z/Architecture, offered by International Business Machines (IBM®) Corporation, Armonk, N.Y. Computing environment 200 includes, for example, a central processor complex (CPC) 202 coupled to one or more input/output (I/O)

devices 206 via one or more control units 208. Central processor complex 202 includes, for instance, a processor memory 204 (a.k.a., main memory, main storage, central storage) coupled to one or more central processors (a.k.a., central processing units (CPUs)) 210, and an input/output subsystem 211, each of which is described below.

Processor memory 204 includes, for example, one or more partitions 212 (e.g., logical partitions), and processor firmware 213, which includes, for instance, a logical partition hypervisor 214 and other processor firmware 215. One example of logical partition hypervisor 214 is the Processor Resource/System Manager (PR/SM), offered by International Business Machines Corporation, Armonk, N.Y.

A logical partition functions as a separate system and has one or more applications 220, and optionally, a resident operating system 222 therein, which may differ for each logical partition. In one embodiment, the operating system is the z/OS operating system, the z/VM operating system, the z/Linux operating system, or the TPF operating system, offered by International Business Machines Corporation, Armonk, N.Y. Logical partitions 212 are managed by logical partition hypervisor 214, which is implemented by firmware running on processors 210. As used herein, firmware includes, e.g., the microcode and/or millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Central processors 210 are physical processor resources allocated to the logical partitions. In particular, each logical partition 212 has one or more logical processors, each of which represents all or a share of a physical processor 210 allocated to the partition. The logical processors of a particular partition 212 may be either dedicated to the partition, so that the underlying processor resource 210 is reserved for that partition; or shared with another partition, so that the underlying processor resource is potentially available to another partition. In one example, one or more of the CPUs include aspects of the management facility 224 described herein.

Input/output subsystem 211 directs the flow of information between input/output devices 206 and main storage 204. It is coupled to the central processing complex, in that it can be a part of the central processing complex or separate therefrom. The I/O subsystem relieves the central processors of the task of communicating directly with the input/output devices and permits data processing to proceed concurrently with input/output processing. To provide communications, the I/O subsystem employs I/O communications adapters. There are various types of communications adapters including, for instance, channels, I/O adapters, PCI cards, Ethernet cards, Small Computer Storage Interface (SCSI) cards, etc. In the particular example described herein, the I/O communications adapters are channels, and therefore, the I/O subsystem is referred to herein as a channel subsystem. However, this is only one example. Other types of I/O subsystems can be used.

The I/O subsystem uses one or more input/output paths as communication links in managing the flow of information to or from input/output devices 206. In this particular example, these paths are called channel paths, since the communication adapters are channels.

Figure 3A:
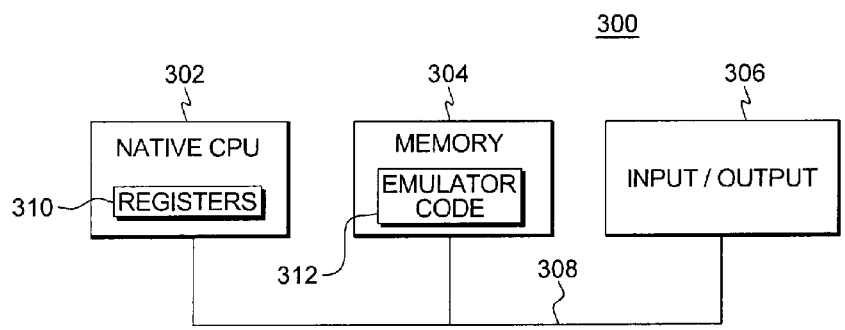
FIG. 3A depicts yet a further embodiment of a computing environment to incorporate and/or use one or more aspects of the present invention.

Another embodiment of a computing environment to incorporate and use one or more aspects of the management facility is described with reference to FIG. 3A. In this example, a computing environment 300 includes, for instance, a native central processing unit (CPU) 302, a memory 304, and one or more input/output devices and/or interfaces 306 coupled to one another via, for example, one or more buses 308 and/or other connections. As examples, computing environment 300 may include a PowerPC processor or a pSeries server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 302 includes one or more native registers 310, such as one or more general purpose registers and/or one or more special purpose registers used during processing within the environment. These registers include information that represents the state of the environment at any particular point in time.

Moreover, native central processing unit 302 executes instructions and code that are stored in memory 304. In one particular example, the central processing unit executes emulator code 312 stored in memory 304. This code enables the computing environment configured in one architecture to emulate another architecture. For instance, emulator code 312 allows machines based on architectures other than the z/Architecture, such as PowerPC processors, pSeries servers, HP Superdome servers or others, to emulate the z/Architecture and to execute software and instructions developed based on the z/Architecture.

Figure 3B:
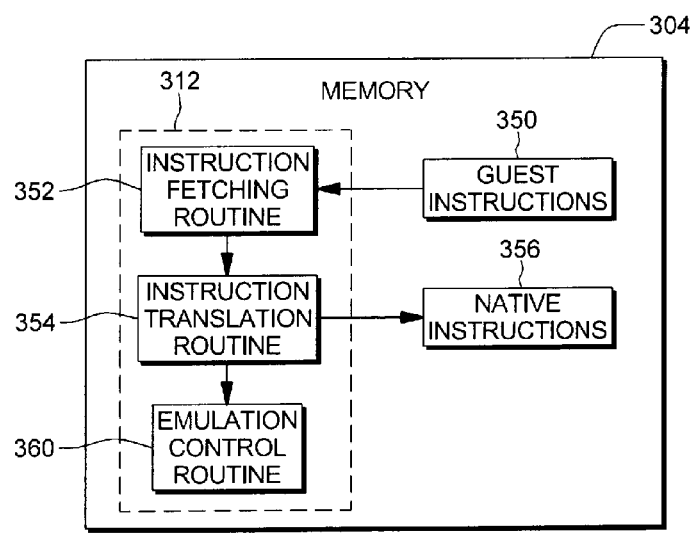
FIG. 3B depicts further details of the memory of the computing environment of FIG. 3A, in accordance with an aspect of the present invention.

Further details relating to emulator code 312 are described with reference to FIG. 3B. Guest instructions 350 stored in memory 304 comprise software instructions (e.g., correlating to machine instructions) that were developed to be executed in an architecture other than that of native CPU 302. For example, guest instructions 350 may have been designed to execute on a z/Architecture processor 102, but instead, are being emulated on native CPU 302, which may be, for example, an Intel Itanium II processor. In one example, emulator code 312 includes an instruction fetching routine 352 to obtain one or more guest instructions 350 from memory 304, and to optionally provide local buffering for the instructions obtained. It also includes an instruction translation routine 354 to determine the type of guest instruction that has been obtained and to translate the guest instruction into one or more corresponding native instructions 356. This translation includes, for instance, identifying the function to be performed by the guest instruction and choosing the native instruction(s) to perform that function.

Further, emulator code 312 includes an emulation control routine 360 to cause the native instructions to be executed. Emulation control routine 360 may cause native CPU 302 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 356 may include loading data into a register from memory 304; storing data back to memory from a register; or performing some type of arithmetic or logic operation, as determined by the translation routine.

Each routine is, for instance, implemented in software, which is stored in memory and executed by native central processing unit 302. In other examples, one or more of the routines or operations are implemented in firmware, hardware, software or some combination thereof. The registers of the emulated processor may be emulated using registers 310 of the native CPU or by using locations in memory 304. In embodiments, guest instructions 350, native instructions 356 and emulator code 312 may reside in the same memory or may be disbursed among different memory devices.

The computing environments described above are only examples of computing environments that can be used. Other environments, including but not limited to, other non-partitioned environments, other partitioned environments, and/or other emulated environments, may be used; embodiments are not limited to any one environment.

Each computing environment is capable of being configured to include one or more aspects of the present invention. For instance, each may be configured to manage and/or perform event recording and/or reporting of applications that include prefix instructions.

Figure 4A:
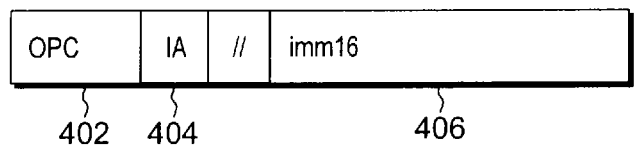
FIGS. 4A-4C depict various examples of a prefix instruction used in accordance with one or more aspects of the present invention.

One example of a prefix instruction is described with reference to FIG. 4A. In one example, a prefix instruction 400A includes, for instance, an operation code (OPC) field 402 including an operation code that specifies a prefix instruction; an instruction address (IA) field 404 including an indicator indicating whether an address based on a successor instruction, such as the current instruction address (e.g., the program counter) of a successor instruction, is to be used as a base address for the successor instruction, thus overriding one or more operands of the successor instruction (referred to as a prefixed instruction); and at least one immediate (imm16) field 406 including a value (e.g., 16 bits) that is to be employed with (e.g., added to) one or more operands of the successor instruction. The instruction address indicator and the value(s) are referred to herein as a prefix. The prefix is specified by the prefix instruction, as one example.

Figure 4B:
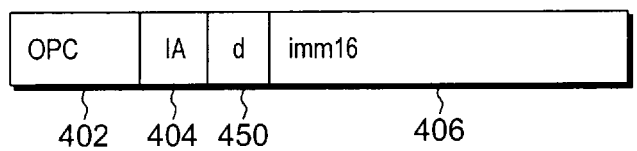
Figure 4C:
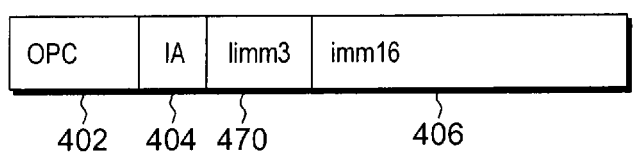

In a further embodiment, as shown in FIG. 4B, a prefix instruction 400B may include a displacement specifier field (d) 450 that indicates whether additional immediate bits are to be used.

In yet a further embodiment, a prefix instruction 400C includes a further immediate (Iimm3) field 470 including a value (e.g., 3 bits) which may be employed with (e.g., added to, OR'd with) low order bits of an immediate operand of the successor instruction, while the value in immediate field 406 may be employed with high order bits of an immediate operand. Additionally, Iimm3 may be used to override one or more bits of an immediate operand of the successor instruction. As examples, if an instruction has a DS immediate field (e.g., a Load Floating-Point Double Pair or a Store Floating-Point Double Pair instruction), then the operand of the field may be extended as follows: imm16||DS||Iimm3<1:2>; or in another example, imm16||DS<16:28>||Iimm3<0:2>. Many other possibilities exist. For instance, Iimm3 may be OR'd, e.g., (DS||0b00) OR Iimm3<0:2>. Again, other possibilities exist.

In one example, in operation of the prefix instruction (e.g., 400A, 400B, 400C), a special purpose register, referred to herein as SPRd, is updated to include values of the fields of the instruction. For instance, one field of the register (e.g., SPRd[val]) is set equal to the value in immediate field 406. Further, another field of the register (e.g., SPRd[IA]) is set equal to the instruction address indicator included in the prefix instruction (e.g., set to one to indicate that the current instruction address is to be used as a base address in the next instruction). In yet a further embodiment, another field of the register or an existing field (e.g., val) may include the value in immediate field 470. Other possibilities also exist. These values are then used in many types of instructions, including D-form instructions that include displacements, x-form instructions (i.e., index form instructions computing a memory address as the sum of two registers, e.g., RA+RB), etc.

In accordance with one or more aspects, a capability is provided for managing prefixed code (e.g., code that includes prefix instructions) in order to perform profiling, tracing and/or single stepping. A part of this managing includes appropriately decoding the code.

Figure 5:
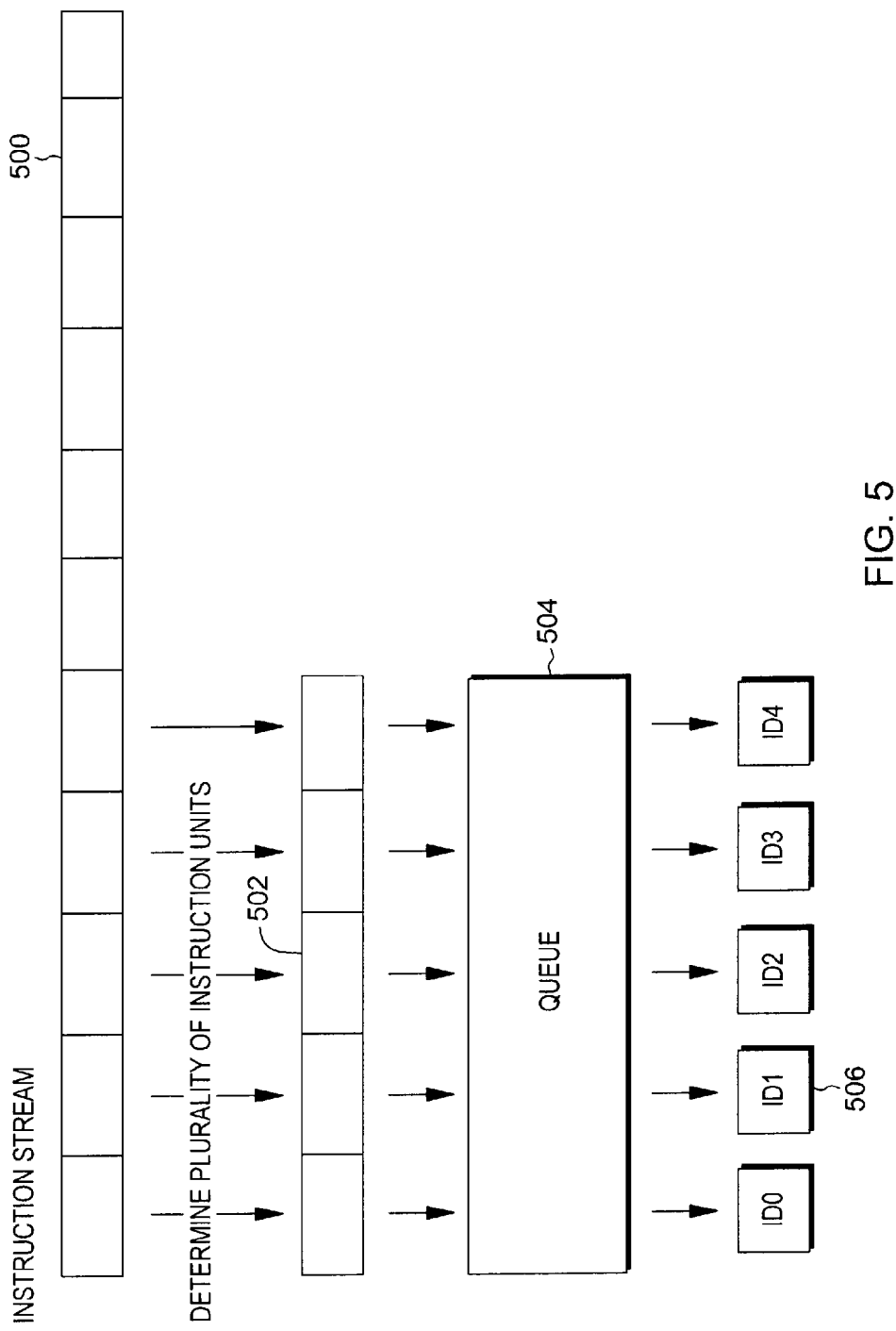
FIG. 5 depicts one example of a plurality of instruction decode units receiving a plurality of instruction units, in accordance with one or more aspects of the present invention.

One example of processing associated with decoding application code is described with reference to FIG. 5. As shown, an instruction stream 500 includes a plurality of instruction units 502. For the Power Architecture, each instruction unit is 4 bytes, and therefore, each instruction unit is the same size. However, in other examples, such as the z/Architecture, the size of the instruction unit is determined by one or more bytes of the instruction. In this particular example, five instruction units are processed in parallel, but in other embodiments, there may be more or less instruction units being processed in parallel. The instruction units are placed in a queue 504 and then passed to instruction decode units 506 (ID; e.g., ID0-ID4); also referred to herein as decoders or decoder units. Each instruction decode unit decodes its instruction unit.

Figure 6:
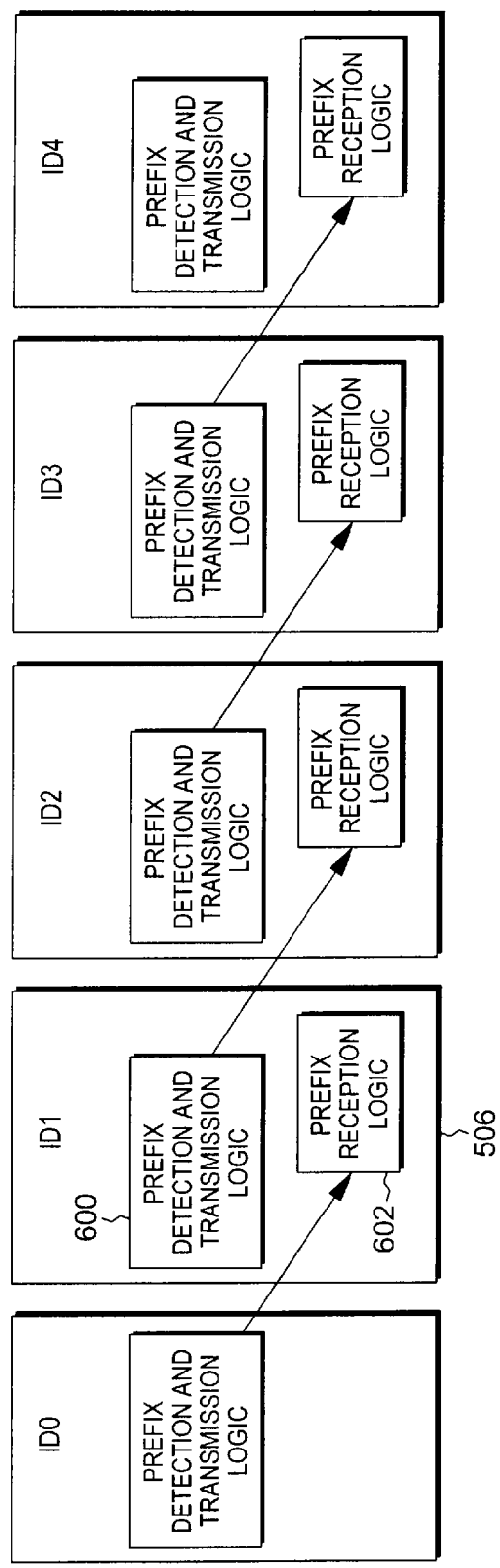
FIG. 6 depicts further details of the instruction decode units of FIG. 5, in accordance with one or more aspects of the present invention.

Further details of an instruction decode unit are described with reference to FIG. 6. In one example, each decoder includes prefix detection and transmission logic 600 and prefix reception logic 602, as well as other logic.

Prefix detection and transmission logic 600 detects if the instruction received by the decoder is a prefix instruction, and if it is, it is forwarded to prefix reception logic 602 of a neighboring instruction unit decoder 506. For instance, prefix detection and transmission logic 600 checks the opcode of the instruction and determines that it is a prefix instruction. It then forwards the instruction (or portions thereof0 to the next instruction decode unit in succession. As an example, if prefix detection and transmission logic 600 of ID0 detects that the instruction is a prefix instruction, then it forwards the instruction to ID1. Reception logic 602 of ID1 receives the prefix instruction, which is to be used with the instruction received at ID1 by prefix detection and transmission logic 600 of ID1. The prefix instruction and the instruction to be modified by the prefix instruction (i.e., the prefixed instruction) are decoded together.

In one embodiment, a determination of the presence of a prefix may be made by a single instruction decode unit to which the prefix is assigned, thereby initiating the combining of the prefix and the prefixed instruction.

Figure 7:
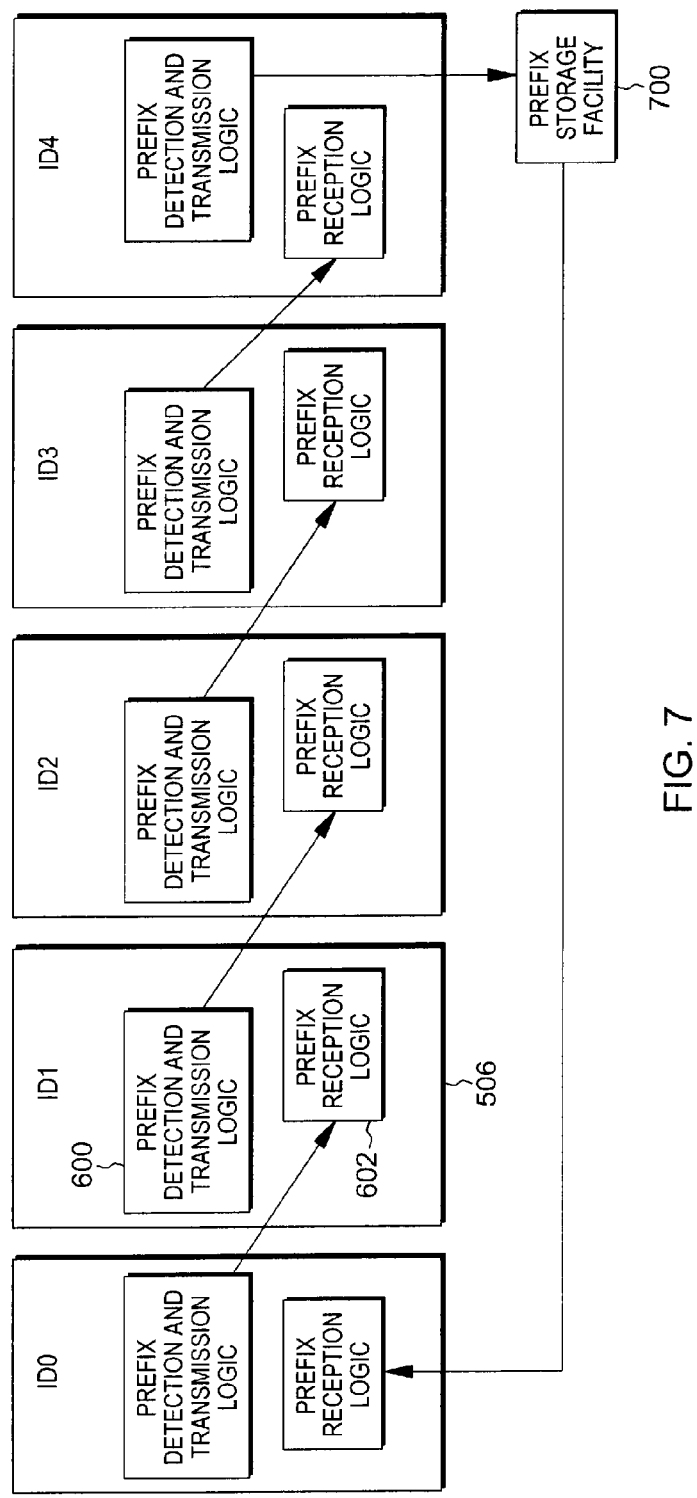
FIG. 7 depicts one example of a prefix storage facility used in accordance with one or more aspects of the present invention.

In a further embodiment, referring to FIG. 7, a prefix storage facility 700 is provided in the event that the last decoder unit in the group of decoder units includes the prefix instruction. This is to accommodate the fact that the last decoder has no "next" decoder in which to forward the prefix instruction. The prefix instruction is saved in prefix storage facility 700, and then forwarded to the first decoder (ID0) of the next group of instruction units to be decoded. Therefore, the prefix instruction is united with the instruction to be prefixed, and they are decoded together. In one embodiment in which there are multithreaded processors, i.e., processors with hardware multithreading or simultaneous multithreading, multiple prefix storage facilities 700 may be present, one for each thread.

In accordance with an aspect of the present invention, the prefix detection and transmission logic includes or is coupled to other logic used to perform tracking and/or reporting of instructions. This other logic takes into consideration that instructions may be prefix instructions and handles those instructions accordingly.

Figure 8:
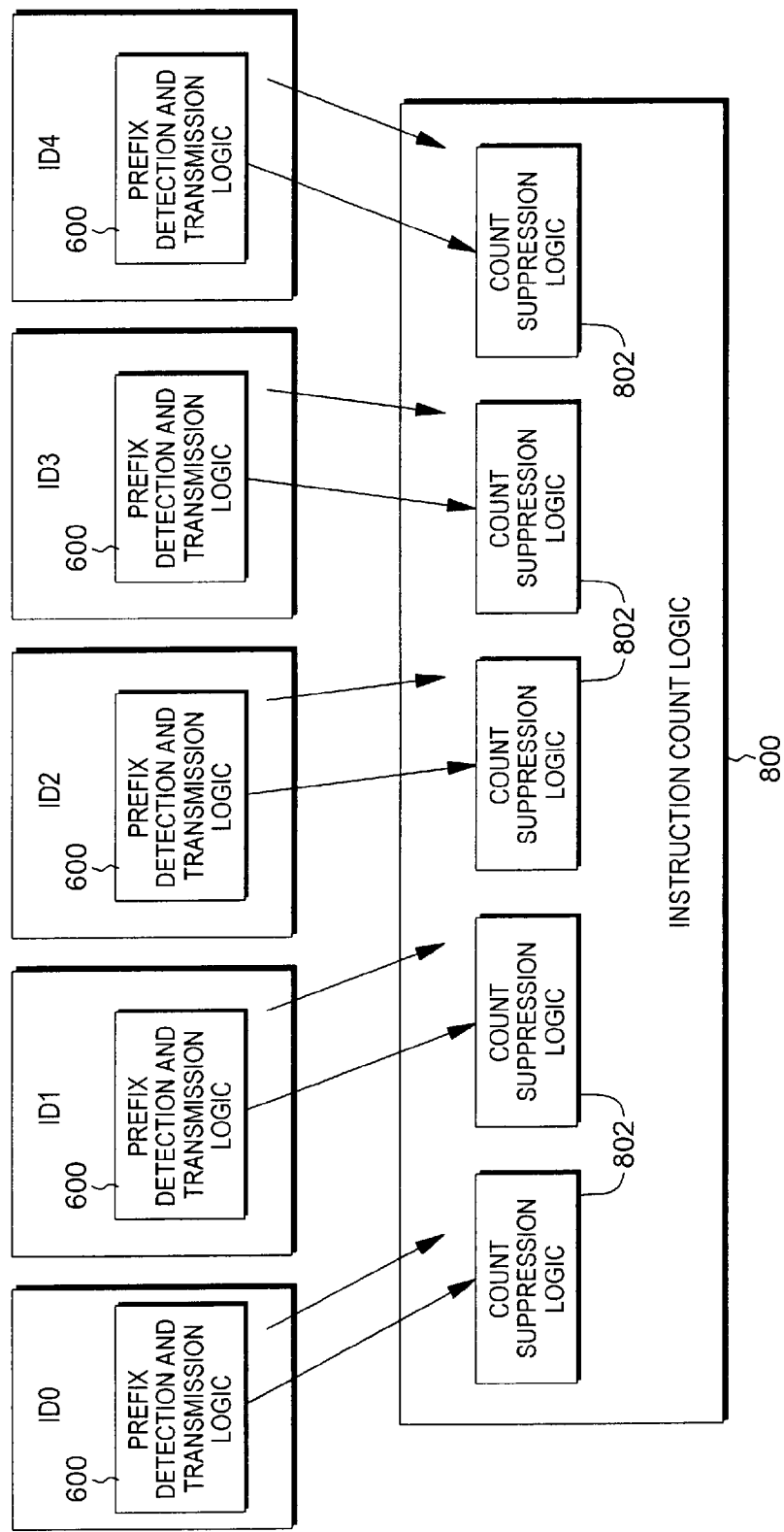
FIG. 8 depicts one embodiment of instruction count logic modified in accordance with one or more aspects of the present invention.

For instance, in one embodiment referring to FIG. 8, prefix detection and transmission logic 600 includes or is coupled to instruction count logic 800 that includes count suppression logic 802. The instruction count logic and the count suppression logic may be used to count instructions while suppressing counting of selected instructions, such as prefixed or prefix instructions. Further details relating to suppressing the counting of selected instructions are described with reference to FIG. 9.

Figure 9:
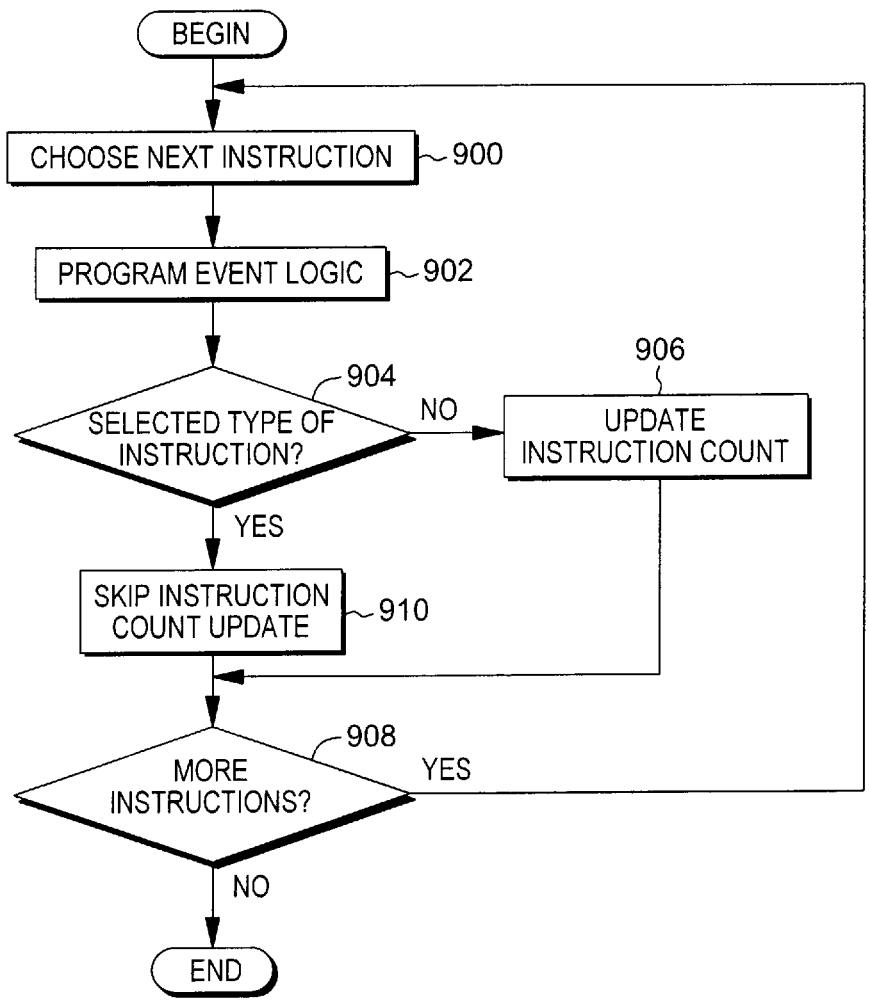
FIG. 9 depicts one example of logic used to count instructions, in accordance with one or more aspects of the present invention.

Referring to FIG. 9, one embodiment of logic used to count instructions when there may be prefix instructions in the code is described. This logic may be performed by one or more units of a processor. In one example, the instruction decode unit performs this logic.

Initially, an instruction is chosen by the decode unit, STEP 900, and the program event logic implemented by the application is performed, STEP 902. A determination is made as to whether the instruction is a selected type of instruction, INQUIRY 904. For instance, is the instruction a prefix instruction, or in another embodiment, a prefixed instruction. If the instruction is not a selected type of instruction, then the instruction count is updated (e.g., incremented by 1), STEP 906. Thereafter, a determination is made as to whether there are more instructions to be processed, INQUIRY 908. If there are more instructions, then processing continues to STEP 900.

Returning to INQUIRY 904, if the instruction is a selected type of instruction, then the instruction is not counted, STEP 910. Processing then continues to INQUIRY 908. The skipping of the instruction allows the prefix and the prefixed instruction to be treated as a single instruction, even though they were received separately by the decoders. This avoids complicating the decode logic. In accordance with embodiments of the present invention, one of prefixed or prefix instructions may be skipped in counting instructions, effectively counting groups of prefixes and prefixed instructions as a single instruction.

Figure 10:
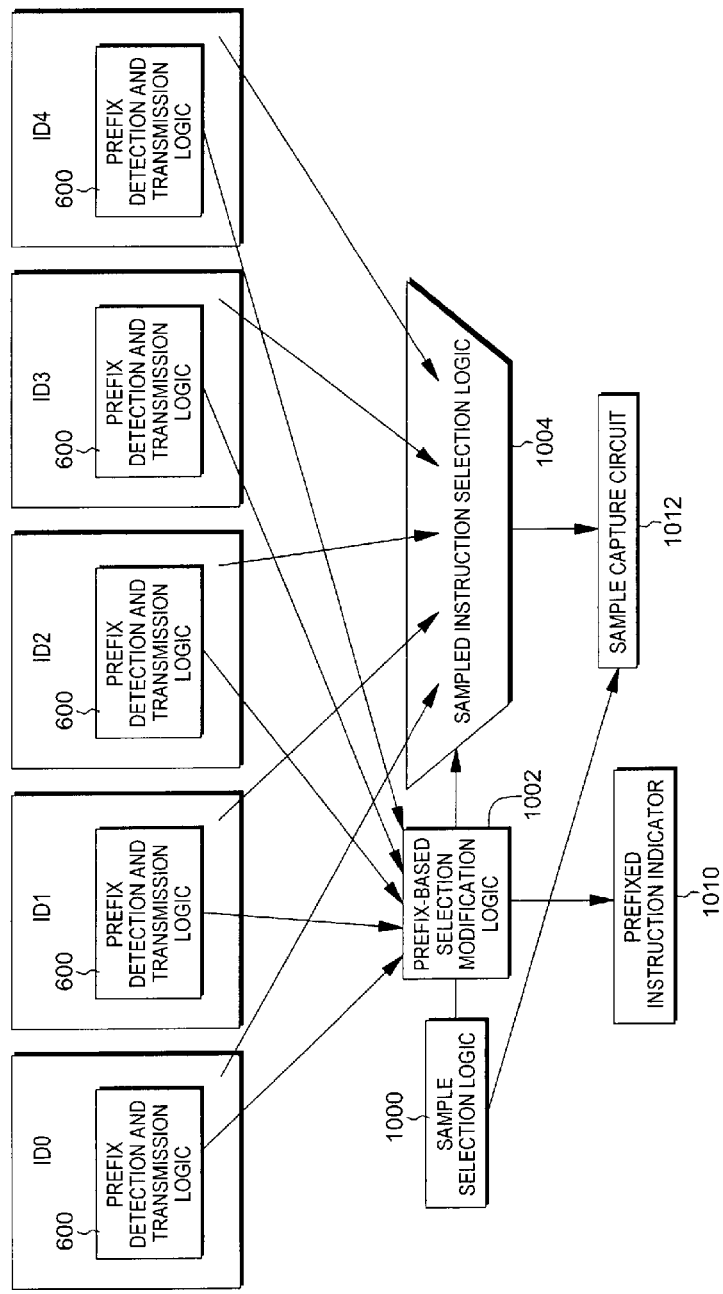
FIG. 10 depicts one example of sampling units used in accordance with one or more aspects of the present invention.

In addition to counting instructions, the tracking and/or reporting of instructions may include sampling instructions. For instance, an instruction is selected every n instructions and reported to provide an indication of the type of instructions being processed. Thus, in one embodiment, as depicted in FIG. 10, the prefix detection and transmission logic 600 includes or is further coupled to other logic, including, but not limited to, sample selection logic 1000, prefix-based selection modification logic 1002 and/or sampled instruction selection logic 1004.

Sample selection logic 1000 includes logic to determine which instructions are to be sampled. For instance, it may indicate that one instruction in every n instructions are to be sampled. Other examples also exist. Sample selection logic 1000 is coupled to prefix-based selection modification logic 1002, which may modify the sample selection logic. For instance, it may indicate that while every n instructions are to be sampled, any prefix instructions are not to be included in the n instructions. The output of modification logic 1002 is provided to sampled instruction logic 1004 which indicates the instruction ultimately selected for sampling. This instruction is stored with the assistance of sample capture circuit 1012. The sample capture circuit may further be operatively coupled to an indication circuit which may either trigger a notification or a recording in a tracing buffer. Notification may occur, for example, in the form of an event based branch, or an interrupt to indicate to one of an application or supervisory software (e.g., such as an operating system or a hypervisor or virtual machine monitor), respectively, the presence of a sample.

Further, if a prefix instruction is encountered, then a prefixed instruction indicator 1010 (e.g., a bit) may be set, e.g., to one, to indicate the presence of a prefix.

Figure 11:
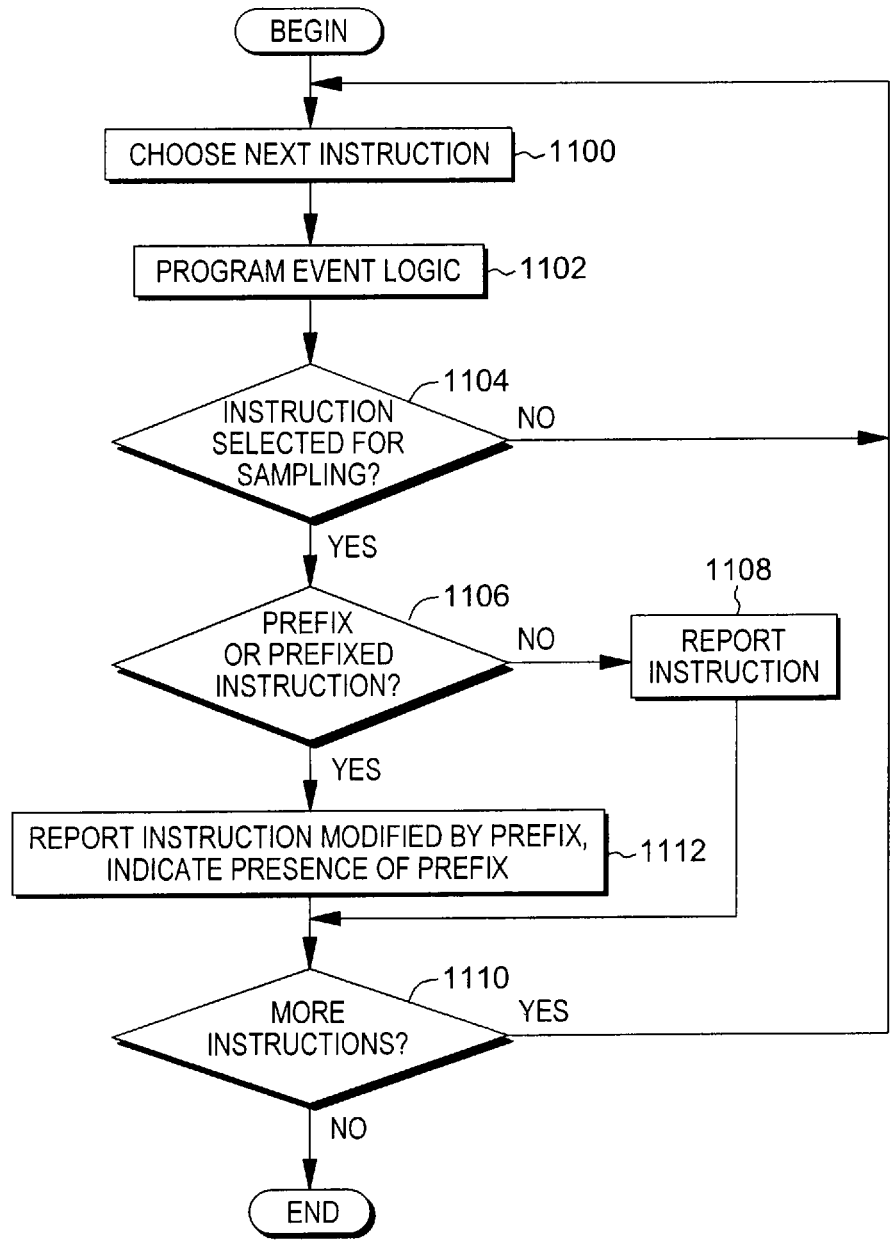
FIG. 11 depicts one example of logic used to sample instructions, in accordance with one or more aspects of the present invention.

With reference to FIG. 11, logic associated with sampling when there may be prefix instructions is described. This logic may be performed by various computing units, but in one example, is performed by a decode unit.

Initially, the decode unit chooses an instruction to decode, STEP 1100, and the program event logic implemented by the application is performed, STEP 1102. A determination is made as to whether the instruction is chosen for sampling (e.g., is it the nth instruction), INQUIRY 1104. If the instruction is not chosen for sampling, then processing continues to STEP 1100. However, if the instruction is chosen for sampling, then a further determination is made as to whether the instruction is a selected instruction, such as a prefixed or a prefix instruction, INQUIRY 1106.

If it is not a prefixed or prefix instruction, then the instruction is reported, STEP 1108. Thereafter, a determination is made as to whether there are more instructions to be processed, INQUIRY 1110. If there are more instructions, then processing continues to STEP 1100.

Returning to INQUIRY 1106, if the instruction is a prefixed or prefix instruction, then the prefixed instruction is reported, but it is reported as being modified by the prefix and an indication is provided of the presence of the prefix, STEP 1112. Processing then continues to INQUIRY 1110.

Figure 12:
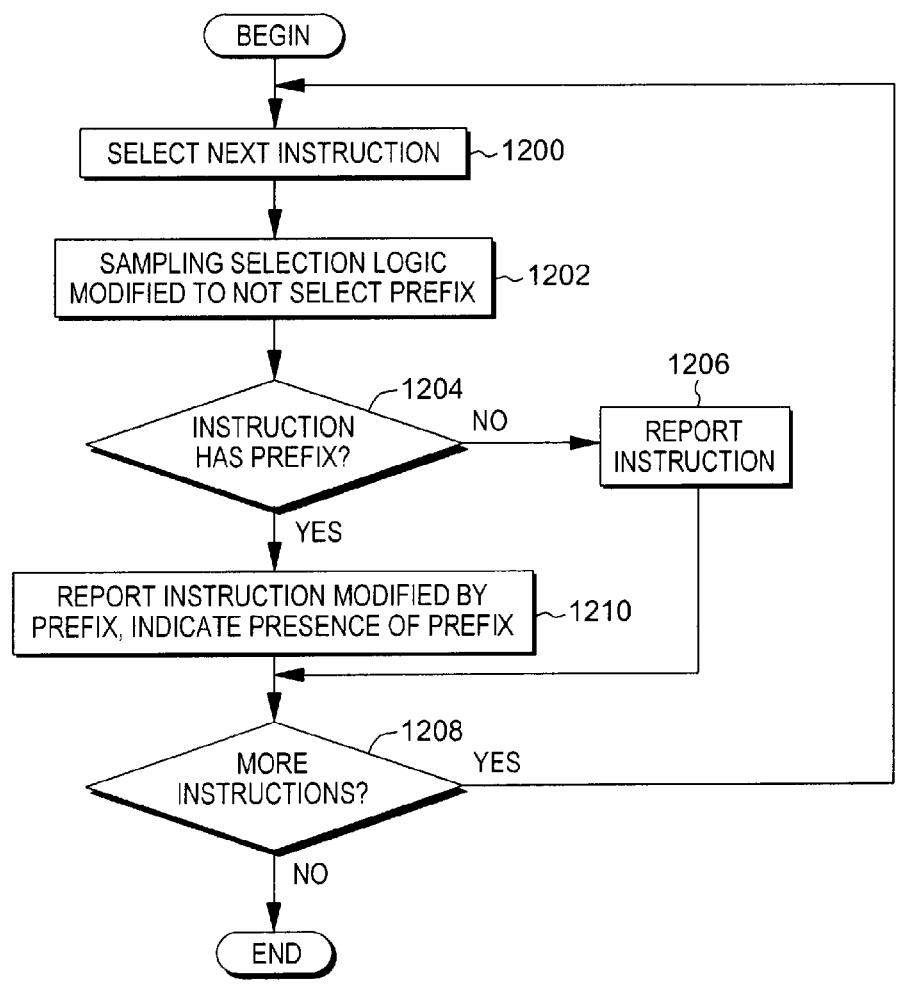
FIG. 12 depicts another example of sampling logic used in accordance with one or more aspects of the present invention.

An alternative embodiment of logic related to sampling is described with reference to FIG. 12. Again, this logic may be performed by the decode unit or other functional computing unit.

In this embodiment, an instruction is selected as the sampled instruction (e.g., the nth instruction), STEP 1200, and the sampling selection logic is modified to not select a prefix instruction, STEP 1202. That is, if the nth instruction is a prefix instruction, it is ignored enabling the next instruction (the prefixed instruction) to be sampled.

A determination is made as to whether the sampled instruction has a prefix, INQUIRY 1204. If the instruction does not have a prefix, then the instruction is reported, STEP 1206. Thereafter, a determination is made as to whether there are more instructions to be processed, INQUIRY 1208. If there are additional instructions to be processed, then processing continues to STEP 1200.

Returning to INQUIRY 1204, if the instruction does have a prefix, then the instruction is reported as being modified by a prefix and an indication is provided of the presence of the prefix. Processing then continues to INQUIRY 1208.

While the foregoing techniques for sampling have been described, in one example, as sampling every n-th instruction, in some embodiments, randomization is performed so as to capture more varied samples, with an average sample rate of one of n instructions in accordance with an aspect of the present invention. In other embodiments, further sampling controls may enable to select one of n memory instructions, or one of n divide instructions, or one of n of any group of selectable instructions in accordance with aspects of the present invention.

In at least one alternate embodiment, when a prefix instruction and/or a prefixed instruction is sampled, the address of the prefix instruction is provided to indicate a sample address.

Figure 13:
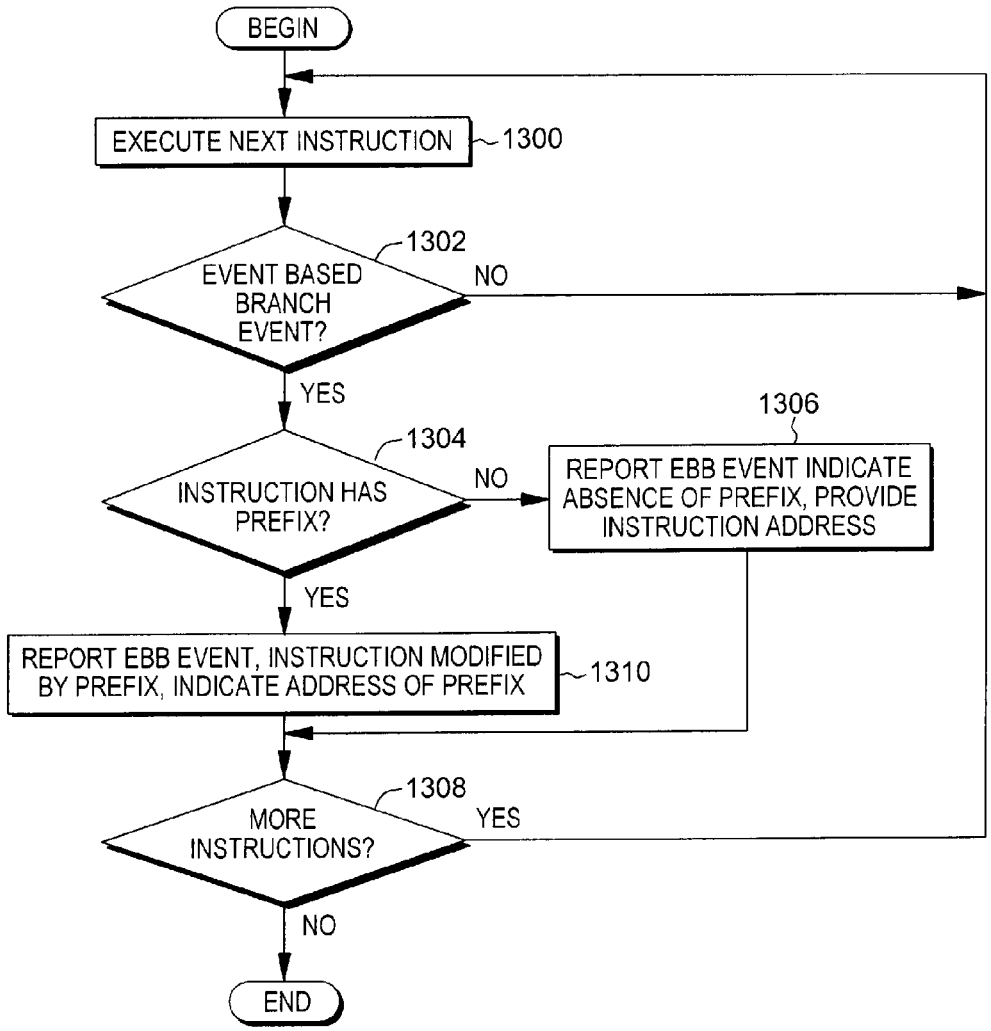
FIG. 13 depicts one example of logic associated with event based branch event processing, in accordance with an aspect of the present invention.

In addition to counting or sampling, the tracking and/or reporting of instructions may include event based branch (EBB) events. Logic associated therewith is described with reference to FIG. 13. As examples, this logic is performed by the execution unit or another functional computing unit.

In one embodiment, an instruction is executed, STEP 1300. A determination is made as to whether an event based branch (EBB) event has occurred, INQUIRY 1302. If an EBB event has not occurred, then processing returns to STEP 1300. However, if an EBB event has occurred, then a determination is made as to whether the instruction has a prefix, INQUIRY 1304. If the instruction does not have a prefix, then the EBB event is reported indicating an absence of the prefix and providing the instruction address, STEP 1306. A determination is made as to whether there are more instructions to be processed, INQUIRY 1308. If there are more instructions to be processed, then processing continues at STEP 1300.

Returning to INQUIRY 1304, if the instruction has a prefix, the EBB event is reported, STEP 1310. Further, the EBB event instruction modified by the prefix is reported, as well as the address of the prefix. Processing then continues to INQUIRY 1308.

Figure 14:
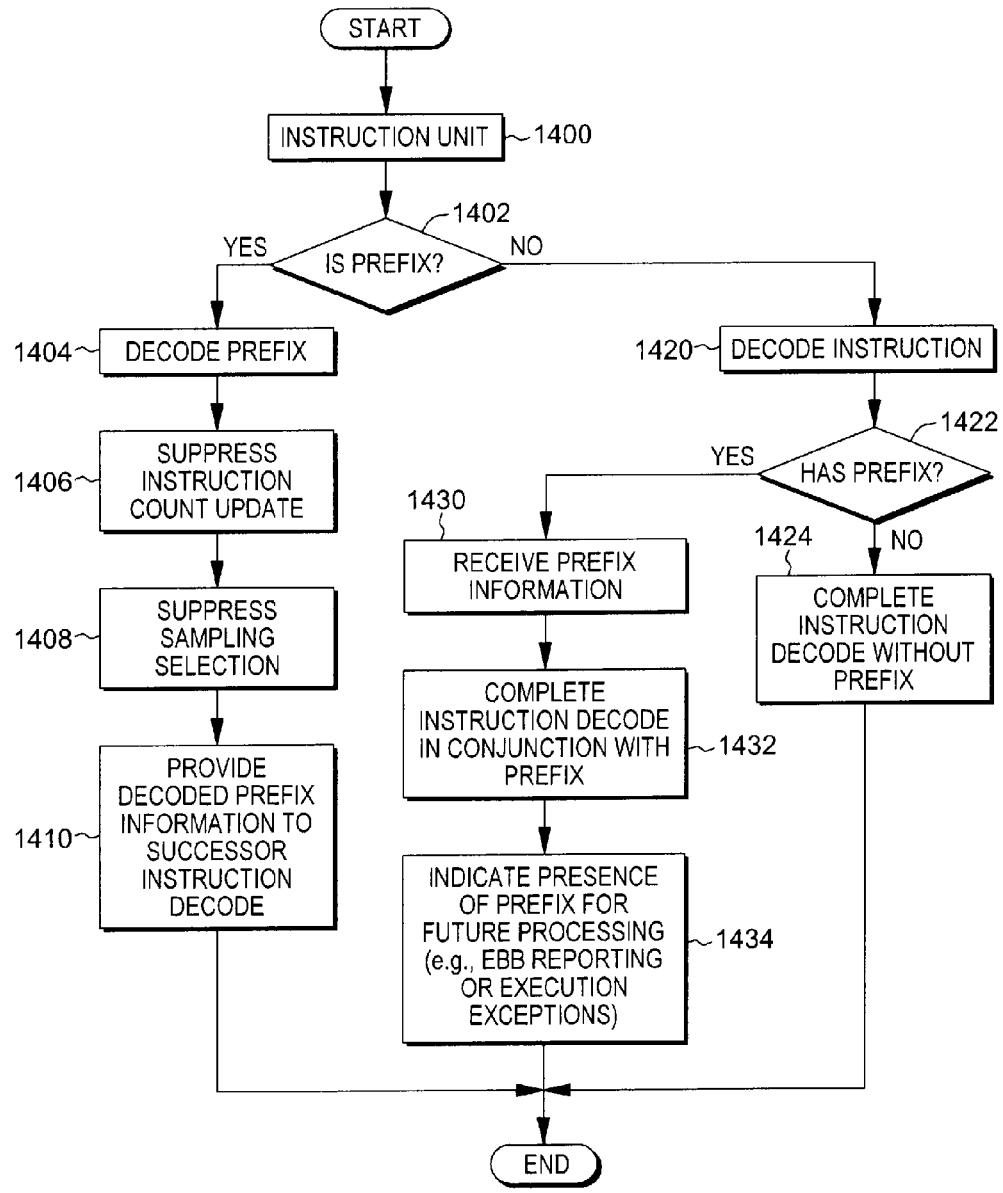
FIG. 14 depicts an overview of logic associated with decoding instruction units, in accordance with one or more aspects of the present invention.

Further details relating to one embodiment of instruction decode of prefix-enabled instructions are described with reference to FIG. 14. Initially, an instruction unit is received by, for instance, an instruction decode unit, STEP 1400. A determination is made as to whether the instruction is a prefix instruction, INQUIRY 1402. If it is a prefix instruction, then the decode unit decodes the prefix, STEP 1404. For instance, it identifies the components of the instruction (e.g., IA, imm16, Limm3) to be used to modify a subsequent instruction, referred to as the prefixed instruction.

Further, in one embodiment, an instruction count update for the prefix instruction is suppressed, STEP 1406, as well as a sampling selection, STEP 1408. The decoded prefix information is then provided to the next decoder unit, STEP 1410.

Returning to INQUIRY 1402, if the instruction is not a prefix instruction, then the instruction is decoded in a known manner, STEP 1420. A determination is made by the decode unit as to whether the instruction has a prefix, INQUIRY 1422. That is, is the instruction being decoded a prefixed instruction. If it is not a prefixed instruction, then the decoding is completed as is known, STEP 1424.

However, if the instruction is a prefixed instruction, INQUIRY 1422, then the prefix information is received, STEP 1430, and the instruction decode is performed in conjunction with the prefix, STEP 1432. For instance, an operand may be overridden and/or one or more operands may be extended. An indication is made as to the presence of the prefix for future processing, such as, for instance, event based branch reporting or execution exceptions, STEP 1434.

Described in detail herein is a management capability to manage the tracking and/or reporting of instructions when the application code includes prefix instructions. This is to enable the provision of accurate reporting of the number of instructions, to account for certain types of instructions in sampling and/or to accurately handle certain events, such as event based branching.

One or more aspects relate to instrumentation of code that includes prefixes. In accordance with one or more aspects of the present invention, there is provided a capability for handling prefixed code for profiling, tracing, and/or single stepping.

In accordance with an aspect for profiling, when profiling is performed, in one embodiment, prefix instructions are not counted in the instruction count. In another aspect, when events are recognized, events are recognized either before a prefix, or after the prefixed instruction. In accordance with a definition of events, event definitions are modified. Thus, for example, when instruction sampling is in effect, in one embodiment, if sampling is enabled, the main instruction is selected, regardless of whether sampling selects a prefix or a prefixed instruction. When the prefix is selected, the prefixed instruction is reported and an indication is provided that a prefix is present. In one embodiment, the address of a prefix is reported as the sampled instruction. (This does not have to be mutually exclusive with reporting the prefixed instruction—for example, when a prefixed "add" instruction is selected, the address of the prefix may be reported and an "add" instruction type may be reported in one embodiment.) In such an embodiment, when an instruction is sampled, the address to be reported is adjusted to reflect the address of the prefix.

In at least one embodiment, where prefixed instructions and instruction prefixes are treated as separate entities, sampling is modified to not select a prefix, or a prefixed instruction but only the prefix. In accordance with such embodiments, an overweighting of a prefixed instruction can be avoided by having the prefixed instruction be eligible twice—once for the prefix, and once for the prefixed instruction.

In accordance with one embodiment, restrictions for sampling are also applied to single step, trace and PER (Program Event Recording) modes.

In yet another embodiment, the reporting of user-level events, such as event based branches or garbage collection handlers, is triggered and reports the address of the prefix as a restart address even when the guarding storage or guarded storage (GC load) access triggers the exception. In another embodiment, an indicator is provided to the GC or other event handler that a prefix was present.

When multiple prefix instruction lengths (or multiple prefix instructions) are supported, a prefix length field is provided in conjunction with an indication that a prefix was present. In at least one embodiment, a prefix indication and prefix length are combined, and a prefix length of 0 indicates an absence of an indication, and a non-0 prefix length indicates the length (or number, or both, in a variety of encodings) of prefixes.

Figure 15A:
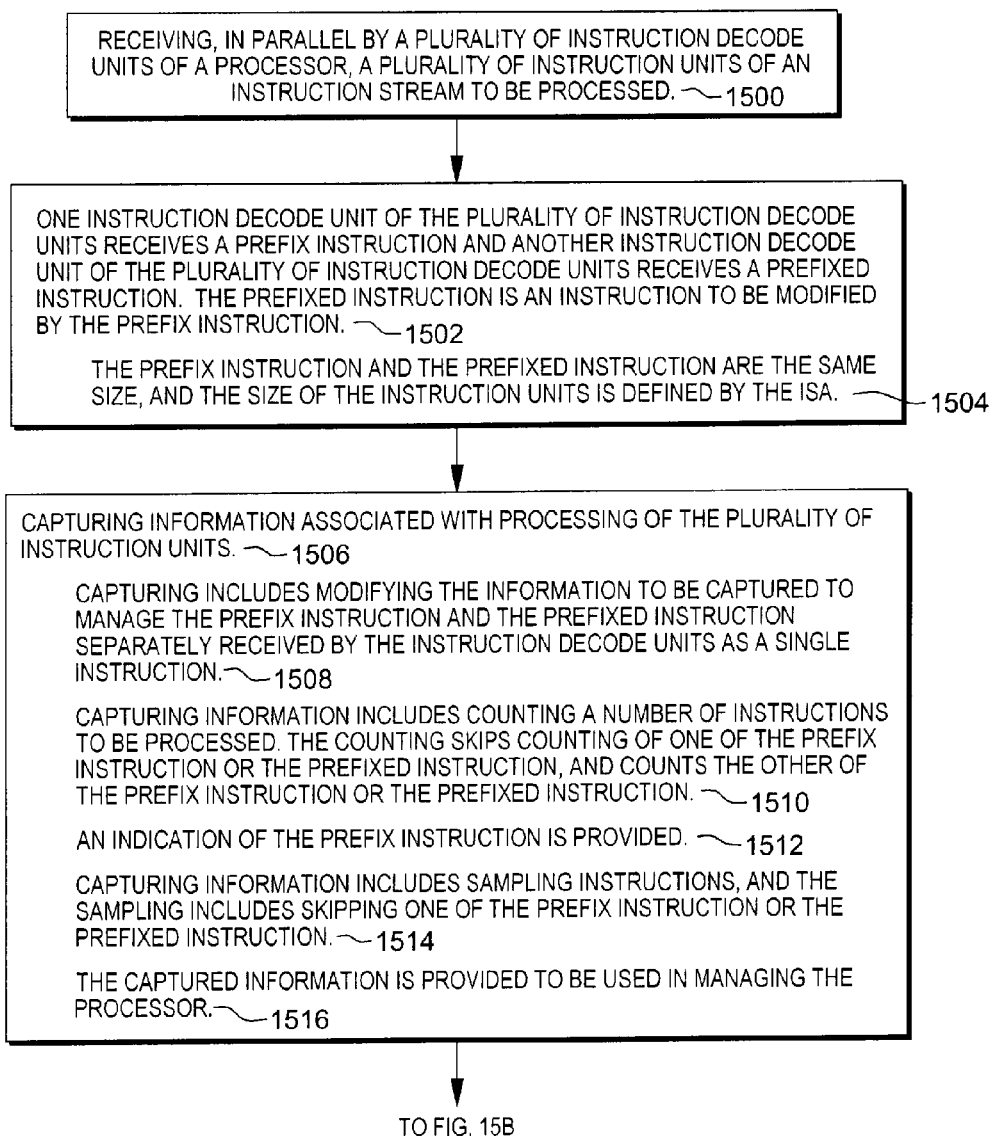
FIGS. 15A-15B depict one example of logic to manage the capturing of information, in accordance with an aspect of the present invention.

One embodiment of processing associated with managing code with prefix instructions is described with reference to FIGS. 15A-15B. Referring to FIG. 15A, a plurality of instruction units of an instruction stream to be processed are received in parallel by a plurality of instruction decode units of a processor, STEP 1500. One instruction decode unit of the plurality of instruction decode units receives a prefix instruction and another instruction decode unit of the plurality of instruction decode units receives a prefixed instruction, STEP 1502. The prefixed instruction is an instruction to be modified by the prefix instruction. As examples, the prefix instruction and the prefixed instruction are the same size, and the size of the instruction units is defined by the instruction set architecture (ISA) of the processor (1504).

Information associated with processing of the plurality of instruction units is captured, STEP 1506. The capturing includes modifying the information to be captured to manage the prefix instruction and the prefixed instruction separately received by the instruction decode units as a single instruction, STEP 1508.

The capturing of the information may include counting a number of instructions to be processed. The counting skips counting one of the prefix instruction or the prefixed instruction, and counts the other of the prefix instruction or the prefixed instruction, STEP 1510. An indication of the prefix instruction is provided, STEP 1512. In a further example, the capturing of the information may include sampling instructions, and the sampling includes skipping one of the prefix instruction or the prefixed instruction, STEP 1514. The captured information is provided to be used in managing the processor, STEP 1516.

Figure 15B:
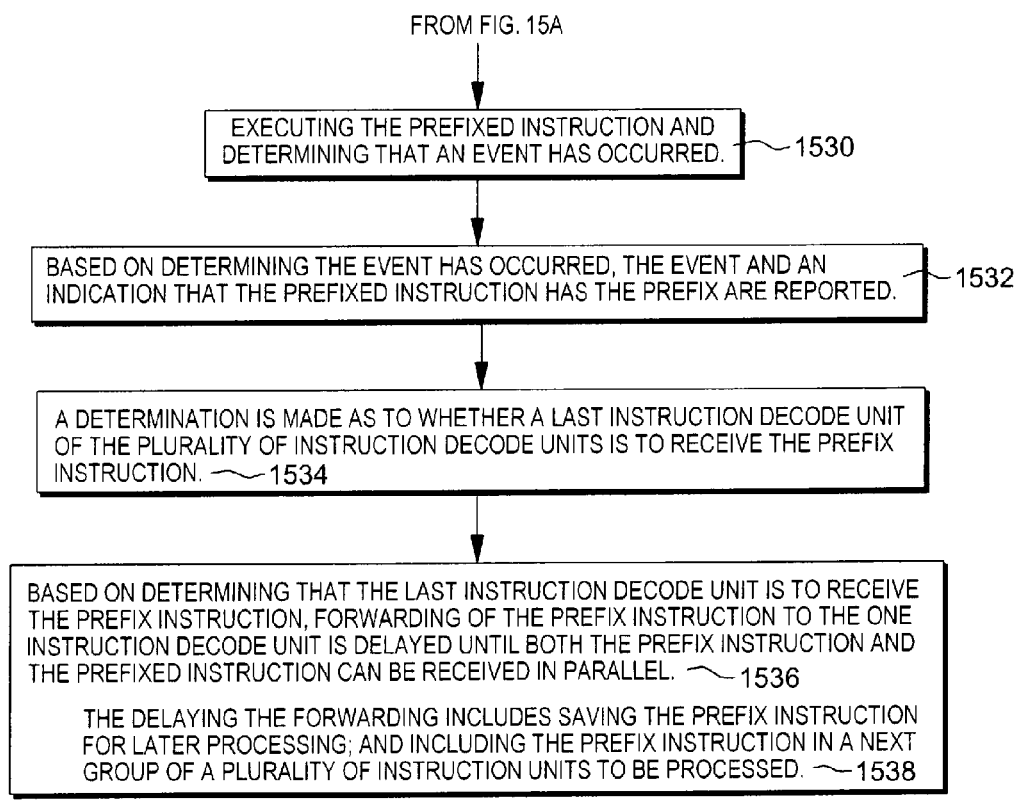

In a further embodiment, the prefixed instruction is executed and a determination is made as to whether an event has occurred, STEP 1530 (FIG. 15B). Based on determining the event has occurred, the event and an indication that the prefixed instruction has the prefix are reported, STEP 1532.

In yet a further embodiment, a determination is made as to whether a last instruction decode unit of the plurality of instruction decode units is to receive the prefix instruction, STEP 1534. Based on determining that the last instruction decode unit is to receive the prefix instruction, the forwarding of the prefix instruction to the one instruction decode unit is delayed until both the prefix instruction and the prefixed instruction may be received in parallel, STEP 1536. The delaying the forwarding includes saving the prefix instruction for later processing, and including the prefix instruction in a next group of a plurality of instruction units to be processed, STEP 1538.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 16:
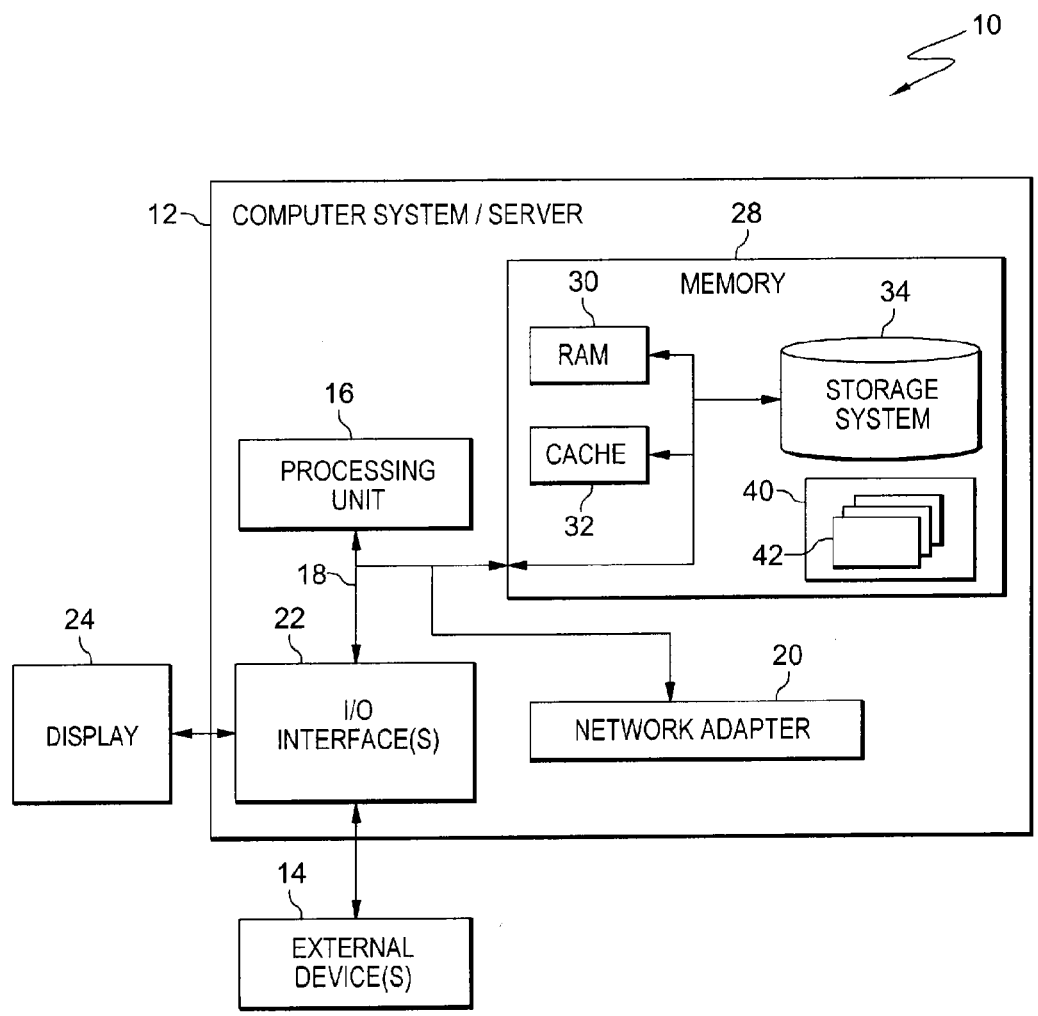
FIG. 16 depicts one embodiment of a cloud computing node.

Referring now to FIG. 16, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 16, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 17:
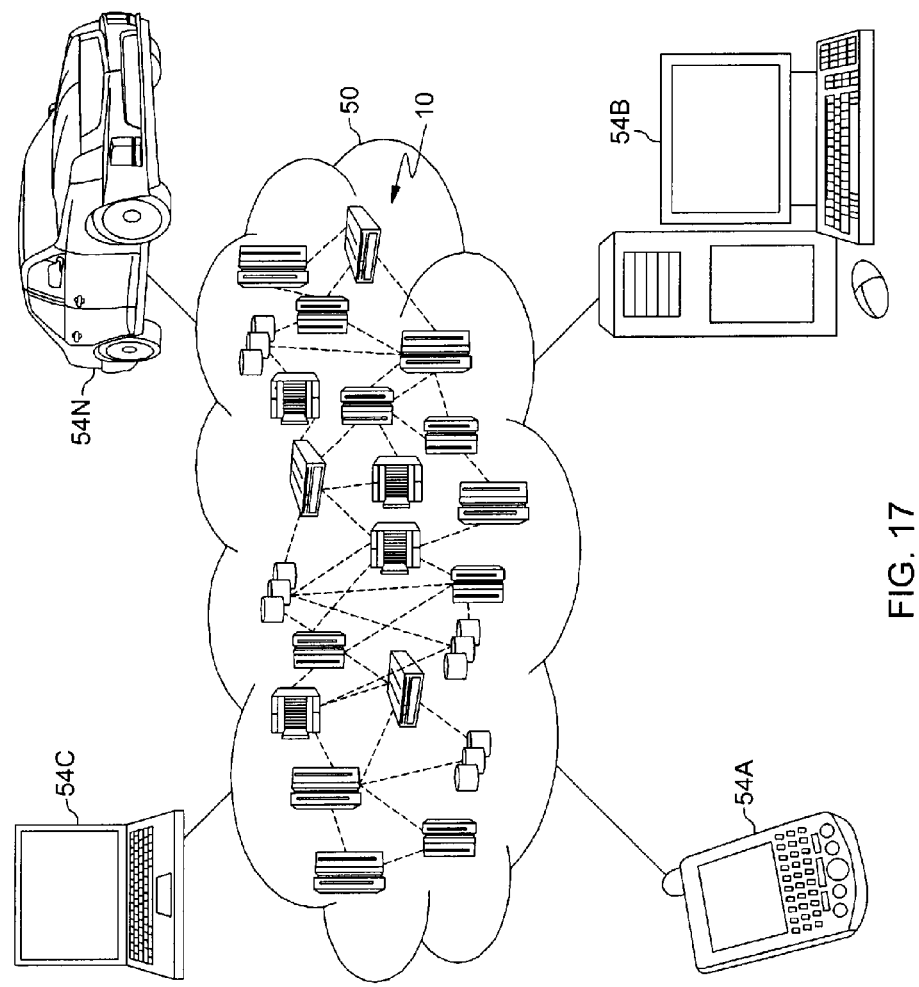
FIG. 17 depicts one embodiment of a cloud computing environment.

Referring now to FIG. 17, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. B are intended to be illustrative only and that computing nodes 10 and cloud computing environment 50 can communicate with any type of computerized device over any type of network and/or network addressable connection (e.g., using a web browser).

Figure 18:
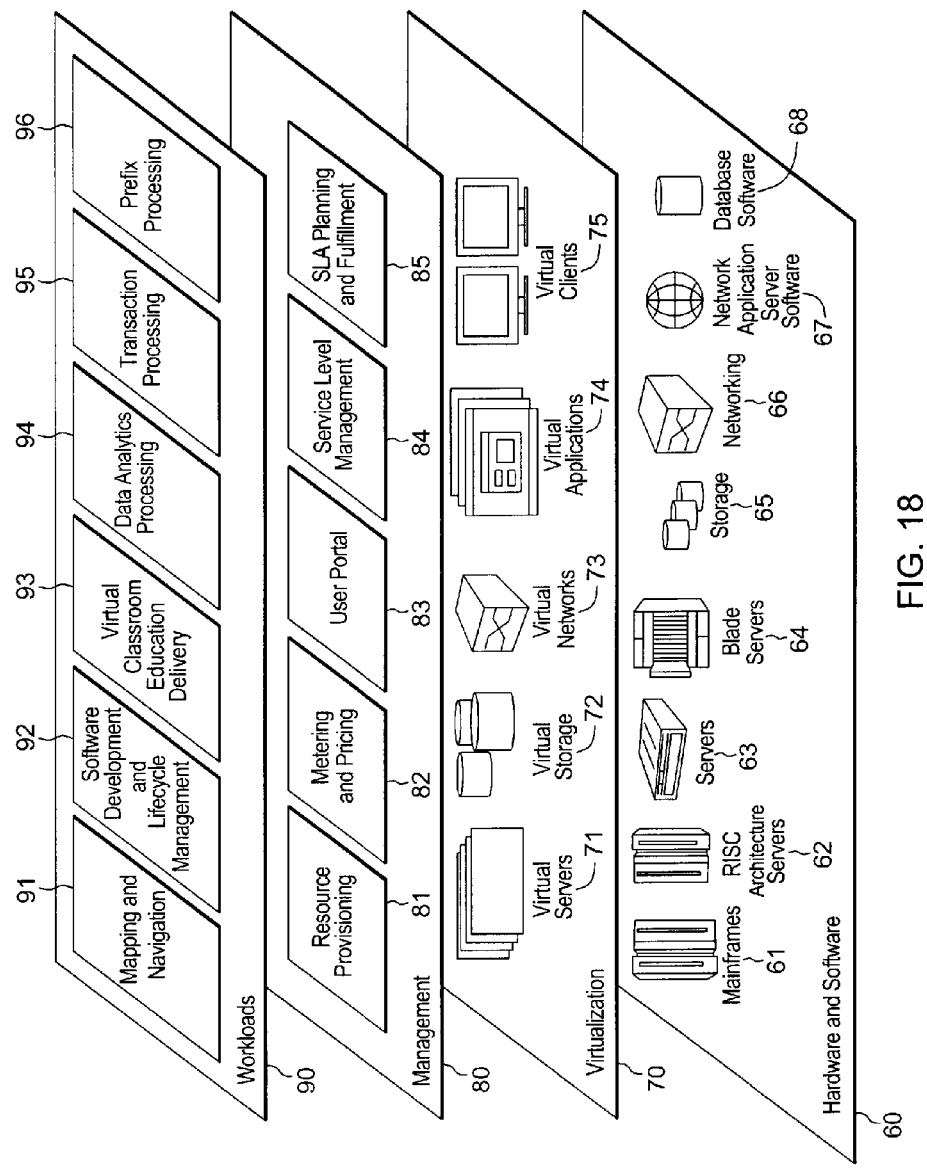
FIG. 18 depicts one example of abstraction model layers.

Referring now to FIG. 18, a set of functional abstraction layers provided by cloud computing environment 50 (FIG. 17) is shown. It should be understood in advance that the components, layers, and functions shown in FIG. 16 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and prefix processing 96, including tracking and/or reporting.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for managing the capture of information, the computer program product comprising:
    a non-transitory computer readable storage medium readable by a processing circuit and storing instructions for execution by the processing circuit for performing a method comprising:
        receiving, in parallel by a plurality of instruction decode units of a processor, a plurality of instruction units of an instruction stream to be processed, wherein one instruction decode unit of the plurality of instruction decode units receives a prefix instruction and another instruction decode unit of the plurality of instruction decode units receives a prefixed instruction, the prefixed instruction being an instruction to be modified by the prefix instruction; and
        capturing information associated with processing of the plurality of instruction units, wherein the capturing includes modifying the information to be captured to manage the prefix instruction and the prefixed instruction separately received by the instruction decode units as a single instruction, and wherein the capturing information includes counting a number of instructions to be processed, wherein the counting skips counting one of the prefix instruction or the prefixed instruction, and counts the other of the prefix instruction or the prefixed instruction.

2. The computer program product of claim 1, wherein the method further comprises providing an indication of the prefix instruction.

3. The computer program product of claim 1, wherein the capturing information includes sampling instructions, and the sampling includes skipping one of the prefix instruction or the prefixed instruction.

4. The computer program product of claim 1, wherein the method further comprises providing the captured information to be used in managing the processor.

5. The computer program product of claim 1, wherein the method further comprises:
    determining whether a last instruction decode unit of the plurality of instruction decode units is to receive the prefix instruction; and
    based on determining that the last instruction decode unit is to receive the prefix instruction, delaying forwarding the prefix instruction to the one instruction decode unit until both the prefix instruction and the prefixed instruction are to be received in parallel.

6. The computer program product of claim 5, wherein the delaying forwarding includes:
    saving the prefix instruction for later processing; and
    including the prefix instruction in a next group of a plurality of instruction units to be processed.

7. The computer program product of claim 1, wherein the prefix instruction is a same size as the prefixed instruction.

8. The computer program product of claim 1, wherein a size of an instruction unit is defined by an instruction set architecture of an architecture of the processor.

9. The computer program product of claim 1, wherein the method further comprises:
    executing the prefixed instruction;
    determining an event has occurred; and
    based on determining the event has occurred, reporting the event and an indication that the prefixed instruction has the prefix.

10. A computer system for managing the capture of information, the computer system comprising:
    a memory; and
    a processor in communication with the memory, wherein the computer system is configured to perform a method, said method comprising:
        receiving, in parallel by a plurality of instruction decode units of the processor, a plurality of instruction units of an instruction stream to be processed, wherein one instruction decode unit of the plurality of instruction decode units receives a prefix instruction and another instruction decode unit of the plurality of instruction decode units receives a prefixed instruction, the prefixed instruction being an instruction to be modified by the prefix instruction; and
        capturing information associated with processing of the plurality of instruction units, wherein the capturing includes modifying the information to be captured to manage the prefix instruction and the prefixed instruction separately received by the instruction decode units as a single instruction, and wherein the capturing information includes counting a number of instructions to be processed, wherein the counting skips counting one of the prefix instruction or the prefixed instruction, and counts the other of the prefix instruction or the prefixed instruction.

11. The computer system of claim 10, wherein the capturing information includes sampling instructions, and the sampling includes skipping one of the prefix instruction or the prefixed instruction.

12. The computer system of claim 10, wherein the method further comprises:
    determining whether a last instruction decode unit of the plurality of instruction decode units is to receive the prefix instruction; and
    based on determining that the last instruction decode unit is to receive the prefix instruction, delaying forwarding the prefix instruction to the one instruction decode unit until both the prefix instruction and the prefixed instruction are to be received in parallel.

13. The computer system of claim 10, wherein the method further comprises:
   executing the prefixed instruction;
   determining an event has occurred; and
   based on determining the event has occurred, reporting the event and an indication that the prefixed instruction has the prefix.

14. A computer-implemented method of managing the capture of information, the computer-implemented method comprising:
   receiving, in parallel by a plurality of instruction decode units of a processor, a plurality of instruction units of an instruction stream to be processed, wherein one instruction decode unit of the plurality of instruction decode units receives a prefix instruction and another instruction decode unit of the plurality of instruction decode units receives a prefixed instruction, the prefixed instruction being an instruction to be modified by the prefix instruction; and
   capturing information associated with processing of the plurality of instruction units, wherein the capturing includes modifying the information to be captured to manage the prefix instruction and the prefixed instruction separately received by the instruction decode units as a single instruction, and wherein the capturing information includes counting a number of instructions to be processed, wherein the counting skips counting one of the prefix instruction or the prefixed instruction, and counts the other of the prefix instruction or the prefixed instruction.

15. The computer-implemented method of claim 14, wherein the capturing information includes sampling instructions, and the sampling includes skipping one of the prefix instruction or the prefixed instruction.

16. The computer-implemented method of claim 14, further comprising:
   determining whether a last instruction decode unit of the plurality of instruction decode units is to receive the prefix instruction; and
   based on determining that the last instruction decode unit is to receive the prefix instruction, delaying forwarding the prefix instruction to the one instruction decode unit until both the prefix instruction and the prefixed instruction are to be received in parallel.

17. The computer-implemented method of claim 14, further comprising:
   executing the prefixed instruction;
   determining an event has occurred; and
   based on determining the event has occurred, reporting the event and an indication that the prefixed instruction has the prefix.

18. The computer system of claim 10, wherein the method further comprises providing an indication of the prefix instruction.

19. The computer system of claim 12, wherein the method further comprises:
   saving the prefix instruction for later processing; and
   including the prefix instruction in a next group of a plurality of instruction units to be processed.

20. The computer-implemented method of claim 14, further comprising providing an indication of the prefix instruction.

* * * * *